Oct. 3, 1939. L. P. KELLOGG 2,174,700
LIQUID LEVEL INDICATOR
Original Filed July 31, 1935 2 Sheets-Sheet 1
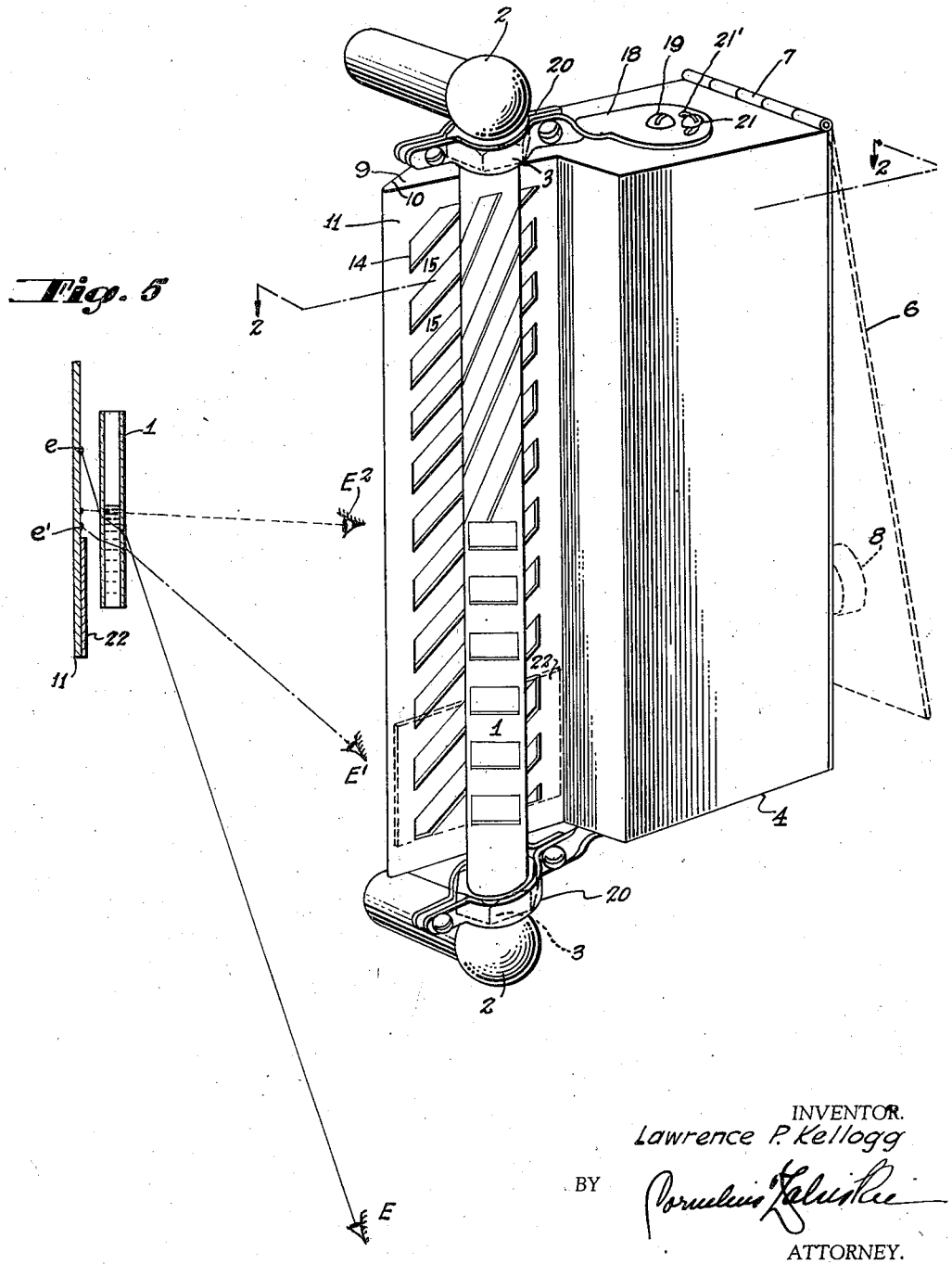
INVENTOR.
Lawrence P. Kellogg
BY
ATTORNEY.

Oct. 3, 1939.  L. P. KELLOGG  2,174,700
LIQUID LEVEL INDICATOR
Original Filed July 31, 1935   2 Sheets—Sheet 2
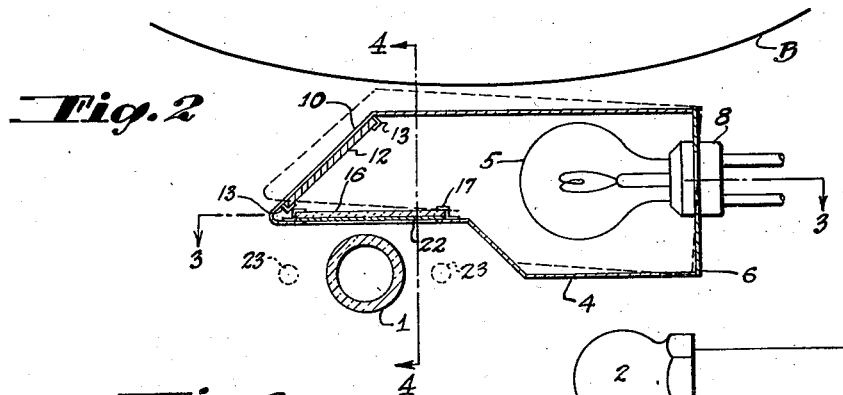
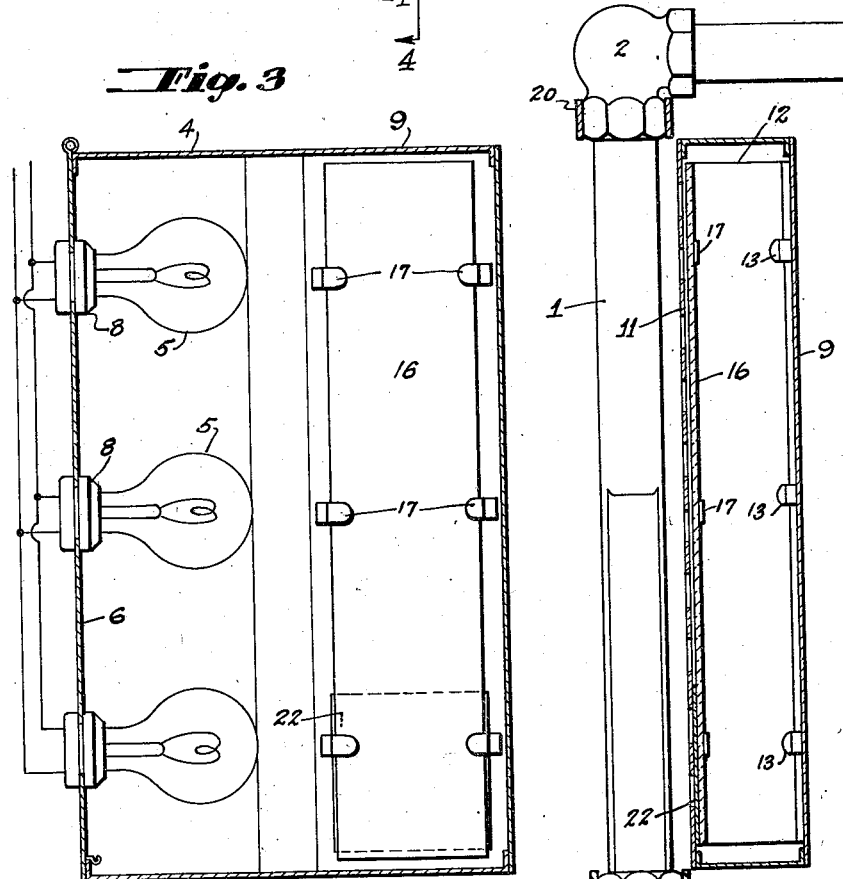
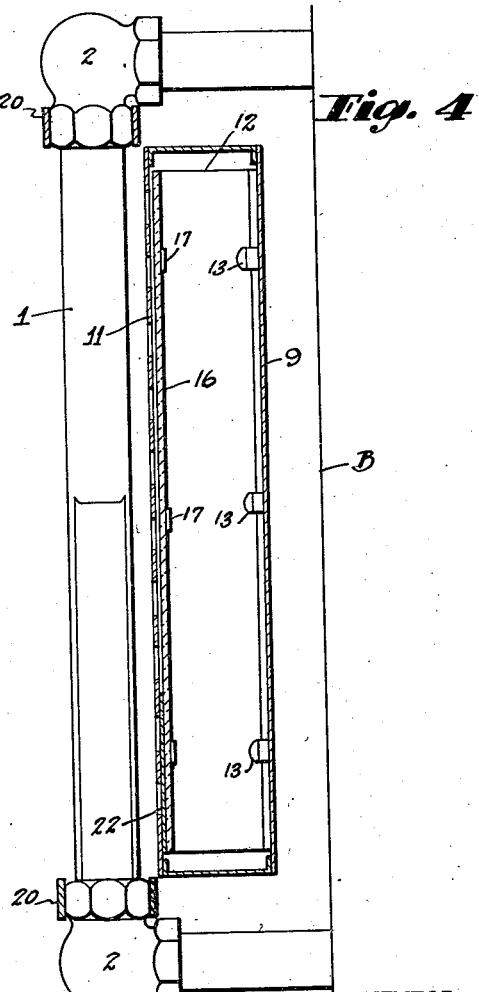
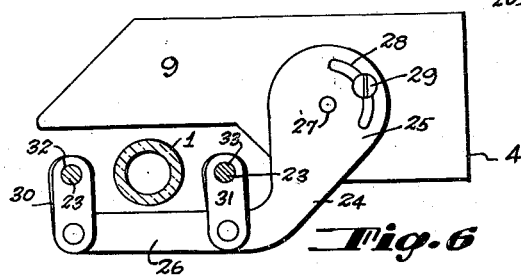
INVENTOR.
Lawrence P. Kellogg
BY
ATTORNEY.

Patented Oct. 3, 1939

2,174,700

UNITED STATES PATENT OFFICE 2,174,700

LIQUID LEVEL INDICATOR

Lawrence P. Kellogg, White Plains, N. Y.

Application July 31, 1935, Serial No. 34,017
Renewed August 22, 1939

4 Claims. (Cl. 73—293)

This invention relates generally to liquid level indicators and more particularly to those wherein the level of the liquid within a vessel may be observed in an associated sight glass column. While the invention is adapted for employment in determining the level of liquids generally, it is especially useful in conjunction with the reading of water levels in the glass water columns of steam boilers. Such boilers are invariably provided with water columns, generally in the form of upright or inclined glass tubes communicating with the water jackets of the boiler, so that the level of the water in the boiler may be seen by observing such associated water column.

The maintenance of predetermined water levels in boilers, particularly those used in the various industries, is highly important for well known reasons and frequent observation is the rule in order that proper water levels may be uniformly assured. Experience has shown, however, that in a great majority of cases, the reading of water columns of boilers in industrial plants is difficult and susceptible to appreciable error. This is due to many factors; for example, the columns may be soiled or stained interiorly or exteriorly. Furthermore, the column may be placed in such position that the engineer or fireman cannot readily obtain a close-up reading or the column may be positioned in a relatively dark corner removed from an appropriate source of light. Boiler room attendants generally attempt to overcome the last mentioned difficulty by hanging an electric bulb adjacent the water column and while such a lamp will illuminate the column, it produces a glare which makes a reading of the water level extremely difficult. The foregoing disadvantages are of widespread prevalence and constitute a recognized hazard in industry.

Attempts have been made to overcome the disadvantages to which I have referred and various devices have been suggested for use in connection with boiler gauge glasses to this end. For example, it has been suggested to place beyond the gauge glass a plate with diagonal stripes of contrasting color, but my experience with devices of this sort show that, unless the gauge glass and water are clean, and unless the parts are well illuminated, these constructions do not solve the problem in the industrial fields. Furthermore, if devices of the kind just referred to are associated with a gauge glass positioned at an appreciable height above the observer, there is a marked tendency to give a false reading and convey the impression of a much greater water level than actually exists.

In connection with high pressure steam boilers, it has also been suggested to project different colored beams of light through a lens system and water column, so constituted that the water is exhibited in one color and the space above the same in a different color. These devices, however, are costly to manufacture and install, require the most careful adjustments and continued maintenance.

With the foregoing considerations in mind, the object of the present invention is to provide a simple and economical liquid level indicator well adapted for use on boilers in the industries, as well as in the home, in apartment houses, etc., and one wherein the water column is illuminated by a concealed source of light operating in conjunction with a dial placed behind the gauge glass in such manner that the observer views the water in the gauge by refracted light, so modified by such refraction, as to clearly indicate the level in the gauge glass. The dial employed is provided with diagonally disposed stripes alternately preferably translucent and opaque, and the translucent portions thereof are non-transparent, so as to eliminate any chance of glare and thereby provide very distinct markings which, when refracted by the water of the water column, are so modified, as to direction, as to produce a clear vision of the water level.

The dial which will hereinafter be described in detail preferably forms part of a light housing of novel constructions, so mounted with respect to the gauge glass that the distance between the dial and the glass may be accurately adjusted in order to control the optical effect of refraction and there is preferably further also associated with said dial an altitude compensator which will compensate for variations in elevation between the eye of the observer and the position of the dial in order to obviate or minimize false reading of water levels.

With the device as described, there are associated other features than those hereinbefore adverted to and these will be apparent from the following detailed description when read in conjunction with the drawings and the appended claims.

The accompanying drawings illustrate different practical embodiments of the invention, but the constructions therein shown are to be understood as illustrative, only, and not as defining the limits of the invention.

Figure 1 is a perspective view showing a device embodying the present invention associated with a gauge glass of a steam boiler.

Figure 2 is a horizontal section on the line 2—2 of Figure 1.

Figure 3 is a section on the line 3—3 of Figure 2.

Figure 4 is a section on the line 4—4 of Figure 2 with the gauge glass and its conventional fittings shown in elevation.

Figure 5 is a diagrammatic view illustrative of the function of the altitude compensator shown in the other figures of the drawings.

Figure 6 is a plan view of the device showing a modified form of mounting bracket.

Referring to the drawings, 1 designates a gauge glass of a steam boiler, which, in accordance with the usual practice, is supported on fittings 2 connected to the boiler, the lower fitting being connected to the water space, while the upper fitting is connected to the steam space. The gauge glass is held to the fittings by means of the conventional packing nuts 3, common to gauges of this kind.

4 designates a lamp housing preferably made of sheet metal. Substantially one lateral half of the housing constitutes the body thereof and is made sufficiently large to house one or more lamps 5 which constitute a source of illumination. The lamps may be mounted in the housing in any suitable way, but for convenience are shown as supported one above another on an end door 6 hinged to the top of the casing as at 7, so that said door may be opened to permit of insertion or replacement of the lamps. The lamps are received in appropriate sockets 8 of insulating material rigidly fixed to the door 6, so as to be insulated therefrom. The wiring to the lamps may be of any appropriate form, but they are shown in Figure 3 as wired in multiple.

At the side opposite the door 6, the casing 4 is provided with a lateral attenuated extension 9 of lesser thickness than the body of the casing. This extension is beveled at its free vertical edge, as shown at 10 in Figures 1 and 2 and is substantially wedge shaped in cross section. The purpose of this construction is to permit the said extension 9 to be introduced back of gauge glasses which are set relatively close to a boiler. In some installations, the gauge glasses are positioned well away from the boiler, while in others relatively little space is left between these parts, so little in fact that a large casing could not be received between them. With the arrangement shown, however, the part which extends back of the gauge is made thin to fit the smallest space commonly found in boiler installations, while the body portion of the housing 4 is made larger, so that sufficiently large conventional lamps may be received therein to give the desired illumination.

The forward face 11 of the extension 9 constitutes the dial of the indicating device and it is adapted to be illuminated by the lamps 5. In order that this illumination may be relatively direct, a suitable reflector 12 is positioned on the interior of the beveled portion 10 of the extension and this reflector is set preferably at 45 degrees, so that light from the lamps will impinge upon and be reflected from the reflector 12 directly upon the interior face of said dial. The reflector may be held in place in any suitable way, but this may be conveniently accomplished by stamping out tongues 13 from the metal of the housing and bending these tongues over the edges of the reflector.

The dial of the present invention may be made in various ways, but I have shown in the drawings a very economical and highly efficient form of construction. In this showing, the wall of the extension which forms the dial 11 is made flat and is punched out to provide parallel openings 14 extending in a diagonal relation and preferably at about 45 degrees to the horizontal. The openings are furthermore preferably spaced apart a distance about equal to the height of the openings, so as to produce a series of parallel openings spaced equidistantly apart by opaque bars 15 of about the same size. The light from the lamps 5 is directed by the reflector 12 through the openings to properly illuminate the same.

My experience, however, has shown that if the light is reflected directly from the lamps through these openings, there is an undesirable glare and consequently I associate with the dial diffusing means which may be positioned either internally or externally of the casing and mounted in any suitable way. For illustration, however, it is shown in the form of a plate of ground glass 16 positioned in face abutting relation with the inner face of the dial 11 and held in place by tongues 17 formed from the wall of the casing and bent over the edges of the diffusing plate. By using ground or frosted glass as stated, glare will not result and a very sharp contrast will be observed between the lighted openings 14 and the intervening opaque bars 15.

The housing is adapted to be mounted in any suitable way in such position that the dial is back of the gauge glass 1 and appropriate means for accomplishing this result is shown in Figure 1 of the drawings, but may be varied without departing from the invention. In this showing, the mounting consists in two brackets 18, one of which is positioned above and the other below the light housing. Each bracket is pivotally secured to one end of the housing, one being attached to the top of the housing and the other to the bottom by means of screws, bolts or rivets 19. Each bracket carries a clamp 20 of any appropriate form adapted to reach out and embrace one of the packing nuts 3, and, when these clamps are so engaged, the brackets will be rigidly mounted with respect to the gauge fixtures 2, while the housing will be free for pivotal adjustment about the common axis of the screws 19, so that the dial 11 may be adjusted toward and away from the gauge glass. When properly adjusted, as presently explained, the housing may be locked in position by a screw 21 which extends through an arcuate slot 21' in each bracket and threads into the housing. The arrangement described gives a rigid mounting, is economical to manufacture and provides for the adjustment necessary to give the best results.

An alternative form of mounting which I may use is shown in Figure 6 of the drawings and is adapted to support the housing upon the guard rods with which practically all boilers are provided to guard the gauge glass against breakage from external contact. These rods, which are designated 23 in Figure 6, form part of the boiler fittings and extend in parallel relation on opposite sides of the gauge glass 1 and are generally detachably supported in place. This bracket indicated at 24 is in the form of a plate 25 having a laterally extending arm 26, which lies in the same plane as the plate 25. Each bracket is secured in place by a rivet or bolt 27 and is adapted for pivotal movement with respect to the housing. It is provided with an arcuate slot 28 to permit of adjustment of the housing and after adjustment is made, the parts may be locked together by a screw 29. One of the brackets is associated with each of the top and bottom of the housing and to each extension 26 are secured two links 30 and 31 provided with perforations 32 and 33, respectively, through which the guard rods 23 are adapted to be passed. The links 30 and 31 are shown as riveted to the extensions 26, but preferably one of these links is rigid with its extension, while the other is pivotally adjustable with respect thereto, so as to allow the device to be mounted on gauge glasses the guard rods of which are spaced different distances apart. I may, in practice, make one of the links of each bracket in the form of an integral lug rigid with the bracket.

With this form of mounting, the rods 23 are simply lifted out and, before they are returned to place, are passed through the perforations 32 and 33 of the brackets. The links 30 and 31 of the lower bracket rest on the fitting at the bottom of the rods and serve to support the weight of the housing, while the upper bracket supports the upper part of the housing against tilting. If desired, the holes or perforations 32 and 33 may be made of a size to fit the largest standard rods and the links given a slight twist so as to conform to and grip rods of smaller diameter, through the inherent resiliency of said links. The advantage of this construction is that it can be applied to gauge glasses of widely varying heights and to guard rods of different spacing and diameter without requiring any modification in the brackets.

The matter of adjustment between the dial and the gauge glass is of importance for the reason that the distance between these parts controls, to a large extent, the optical effect attendant upon the use of this apparatus. A dial of the character described, when used as stated, may be graphically referred to as a refractive astigmatic dial, for it is found that, as the light passes from the openings 14 through the water column and to the eye of an observer, the index of refraction of water is such as to apparently change the direction of the translucent and opaque bars. When the distance between the gauge glass and the dial is properly adjusted, the observer will see bars of light extending relatively horizontally across that portion of the gauge which contains water, while that portion of the gauge above the water line will show bars of light extending diagonally upward at a much greater angle than the 45 degree angle of the openings 14. Beyond the lateral edges of the gauge glass, however, the openings 14 will appear at their natural inclination of 45 degrees. The bars thus appear in three distinct forms with the horizontal bars showing the presence of water and the greatly inclined bars showing the absence of water. The meeting of the lowest greatly inclined bar with the highest horizontal bar distinctly indicates the water level. If the distance between the dial and gauge glass is varied, the inclination of these bars will vary and it is therefore desirable that the adjustment be accurate to give the truly horizontal bars at the water filled portion of the gauge glass for it is this form of bar which is the most easily read, although this may be varied without departing from the invention.

The apparatus as thus far described will give thoroughly satisfactory results in all cases where the gauge glass is approximately on the level of the eye of the observer or within reasonable distances above or below the same. There are, however, numerous cases of industrial boiler installation where the gauge glass is appreciably above the eye of the operator, and unless some definite provision is made for this difference in elevation, dangerous false readings will occur. The effect of this is graphically illustrated in Figure 5, wherein the dial is indicated at 11 and the gauge glass at 1, such gauge glass being shown as about half full of water. Suppose, for the purpose of illustration, that the gauge glass is positioned at about the elevation indicated above the eye E of an observer. The line of sight will be as indicated in full lines in this figure. That is to say, the line of sight will incline upwardly from the eye to the gauge glass 1. It will then be sent by refraction through the glass and through the water column and, as it leaves the glass at the opposite side of the column, it will bend upwardly again as indicated to impinge at the point e, which is about three-quarters of the distance up the dial. The observer at E will thus be led to believe that he has about three-quarters gauge of water, whereas, in fact, he has aproximately one-half. If the eye is at E', the line of sight, indicated in dot and dash lines, will impinge at e', so that the same result will be obtained, though with a lesser factor of error. If the eye is at E2, i. e., substantially on the same level as the gauge glass, appreciably no error will result.

It is thus apparent that, unless some satisfactory means is provided to compensate for the differences in elevation between the observer and the gauge glass, serious errors may result, for it will be possible for the observer positioned at E to read a gauge glass which was almost empty as a half full glass. According to the present invention, means is provided to eliminate this difficulty. It may partake of various forms but a very simple device which I have discovered as entirely practical and trustworthy, is an opaque shield 22 adapted to shield or cut off a sufficient portion of the lower part of the dial to compensate for the difference in elevation referred to. This altitude compensator is shown as a plate of opaque material positioned, in Figures 1–4, between the inner face of the dial and the diffuser 13, while in Figure 5, it is shown as positioned in face abutting relation with the front face of the dial. It operates to decrease the height of the dial from the bottom a distance sufficient to compensate for the difference in altitude. Thus, in Figure 5, where substantially a half gauge of water shows impingement of the line of sight at e, three-quarters up the dial, the compensator 2 should be of a height to cut off about one half of the height of the dial, for it should be remembered that when the water level is observed with this apparatus, the reading is in reality not with reference to the height of the gauge glass, but to the height of the dial and level indication of one half the height of the dial signifies a one-half gauge of water. It is the common practice in reading the water level in a gauge glass to read the level with respect to the total height of the glass, so that the level may be referred to as half a gauge glass or a quarter of a gauge glass. With the present invention only that portion of the length of the gauge glass which is illuminated is read, so that if the lower half of the dial is shielded against the passage of light so that only the upper half is illuminated, the point of impingement e from the line of sight at E will show half a gauge glass on the dial and thus truly indicate the water level in the gauge glass. If the gauge glass is positioned at an elevation wherein it will be ordinarily viewed from $E^2$, the shield 22 would of course be materially lowered or dispensed with for here the reading would be along a substantially horizontal path and would be true and not materially affected by refraction. It is of course feasible to have the altitude compensator adjustable for different heights, although in practice a more simple away is to graduate a sheet of opaque material for different heights or reading angles, so that it may be cut off to the appropriate height when making the installation. As the reading of the water gauge in commercial installations is generally accomplished from a definite station with reference to the boiler, absolute accuracy may thus be obtained.

In the accompanying drawings, I have shown the housing as projecting into the space between the boiler B and the gauge glass from the right, but inasmuch as the bars of the gauge are 45 degrees and the parts reversible, the housing may be so mounted as to project into this space from the left depending upon conditions and particular installations.

I have also described the dial as constituting an integral part of the housing. I prefer this arrangement because of its simplicity and economy of manufacture, as well as its highly efficient optical results. I do not, however, wish the invention to be limited in this connection, as I may use a separate dial of glass or any other suitable material with alternate diagonal bars of contrasting properties and the translucent character of the light penetrable bars may be frosted or otherwise, in the event the dial is of glass or similar material, so as to obviate the necessity of a separate diffuser. The light transmitted to the eye, however, should be a diffused light produced in any appropriate way because, if glare is present, it makes the reading difficult. In fact, I may use a diffusing medium of any kind in connection with this invention without departing from the inventive concept and in some cases prismatic glass may be employed to direct the rays of light or intensify them. For these reasons, I wish it clearly understood that the drawings show the invention in but one illustrative form and that the invention is to be understood as fully commensurate with the appended claims.

Having thus fully described the invention, what I claim as new and desire to secure by Letters Patent is:

1. In a liquid level indicator, a gauge glass, a housing provided with a light penetrable dial, means within said housing for illuminating said dial, means for mounting said housing with the dial in proximity and in spaced relation to the gauge glass, and altitude compensating means comprising a shield for blocking off a sufficient portion of the height of the dial to compensate for differences in altitude between an observer and the dial.

2. In a liquid level indicator, a gauge glass, a housing provided with a light penetrable dial, means within said housing for illuminating said dial, means for mounting said housing with the dial in proximity and in spaced relation to the gauge glass, and a light shield overlying a sufficient portion of one end of the dial for varying the effective height of the dial to compensate for differences in altitude between the dial and an observer.

3. In a liquid level indicator, a gauge glass, a housing provided with a light penetrable dial, means within said housing for illuminating said dial, means for mounting said housing with the dial in proximity and in spaced relation to the gauge glass, and means for shielding a predetermined portion at one end of the dial to compensate for differences in altitude between the dial and an observer.

4. In a liquid level indicator, a gauge glass having guard rods, a housing, means for illuminating the interior of the housing, a light penetrable dial in one wall of the housing comprising a series of diagonally disposed vertically spaced apart parallel bars of optically distinguishable character when illuminated, and means for mounting said housing with the dial in cooperative relation with the water column, said mounting means including brackets adjustable with respect to the housing and having projections perforated for the passage of the guard rods of the gauge glass, the perforations of said projections being larger than said rods and the projections being twisted to compensate for the difference in size between the perforations and the rods.

LAWRENCE P. KELLOGG.